United States Patent

Chen

[11] Patent Number: 5,916,066
[45] Date of Patent: Jun. 29, 1999

[54] WHEEL ASSEMBLY ADAPTED TO BE MOUNTED ON A WHEEL-BEARING TUBE OF AN EXERCISER WITHOUT THE NEED FOR A LOCKING BOLT

[76] Inventor: Ping Chen, No. 29, Nan-Mei St., Nan-Tun Dist., Taichung City, Taiwan

[21] Appl. No.: 09/032,164

[22] Filed: Feb. 27, 1998

[51] Int. Cl.[6] .................................................. A63B 69/06
[52] U.S. Cl. .................................................. 482/57; 16/19
[58] Field of Search .............................. 482/51, 57, 148, 482/52, 59, 62, 63–65, 53, 54; 280/87.1, 642, 647, 87.051, 87.021; 248/129; 16/19, 27, 45, 18 R, 46, 22

[56] References Cited

U.S. PATENT DOCUMENTS

| | | | |
|---|---|---|---|
| 2,456,939 | 12/1948 | Haase | 280/87.1 |
| 4,653,968 | 3/1987 | Rapata et al. | 16/19 |
| 4,733,858 | 3/1988 | Lah | 482/52 |
| 5,326,339 | 7/1994 | Wang | 482/57 |
| 5,357,868 | 10/1994 | Maas | 105/180 |
| 5,439,432 | 8/1995 | Lundin et al. | 482/53 |
| 5,651,754 | 7/1997 | Chen | 482/57 |

*Primary Examiner*—Stephen R. Crow
*Attorney, Agent, or Firm*—Ladas & Parry

[57] ABSTRACT

A wheel assembly includes a molded tubular wheel-mounting member and an annular wheel. The wheel-mounting member has a left portion for press-fitting into an open end of a wheel-bearing tube, and a right portion formed with a closed end wall. A first outward flange projects radially from the closed end wall. A second inward flange is disposed circumferentially on the right portion and is inboard to the first outward flange, thereby defining an annular groove between the first and second outward flanges. The second outward flange has an outer diameter greater than an inner diameter of the wheel-bearing tube to abut against the wheel-bearing tube and limit axial extension of the wheel-mounting member when the left portion is press-fitted into the wheel-bearing tube. The wheel includes a right inner wall section, a left inner wall section which defines an inner diameter greater than an outer diameter of the wheel-bearing tube, and an annular inward protrusion which is proximate to the right inner wall section and which has an inner diameter slightly smaller than the outer diameter of the second outward flange so as to permit sliding of the second outward flange over the annular inward protrusion when forced in an axial direction, thereby retaining rotatably the wheel on the wheel-mounting member.

4 Claims, 3 Drawing Sheets

WHEEL ASSEMBLY ADAPTED TO BE MOUNTED ON A WHEEL-BEARING TUBE OF AN EXERCISER WITHOUT THE NEED FOR A LOCKING BOLT

BACKGROUND OF THE INVENTION

1. Field of the Invention

The invention relates to a wheel assembly for an exerciser, more particularly to an exerciser wheel assembly adapted for mounting on a wheel-bearing tube of an exerciser without the need for a locking bolt.

2. Description of the Related Art

In U.S. Pat. No. 5,651,754, the applicant disclosed a wheel assembly that includes a wheel-mounting member of molded plastic, and an annular wheel. The wheel-mounting member includes a peripheral wall which has a left portion with an open end for extension of the wheel-bearing tube, and a right portion formed with a closed end wall. An annular flange extends axially from an inner side surface of the closed end wall so as to define an annular groove between the peripheral wall and the annular flange to receive the wheel-bearing tube when the latter is inserted into the wheel mounting member via the left portion in such a manner that the wheel-mounting member is fixed on the wheel-bearing tube. The peripheral wall has a first outward flange proximate to the closed end wall, and a second outward flange disposed on the left portion and inboard to the first outward flange, thereby defining a wheel-mounting space between the first and second outward flanges. The peripheral wall further has a plurality of axially extending slots which are formed therethrough and which are opened at the open end of the left portion of the wheel-mounting member so as to define a plurality of flexible jaws. Each of the jaws is located between an adjacent pair of the axially extending slots. The second outward flange is located on the jaws. The annular wheel is sleeved on the wheel-mounting member between the first and second outward flanges, and has an intermediate narrowed inner wall section and two enlarged end inner wall sections which are located on opposite sides of the intermediate narrowed inner wall section and which respectively receive the first and second outward flanges. The intermediate narrowed inner wall section has an inner diameter slightly smaller than an outer diameter of the second inward flange so that the second inward flange can be compressed due to flexibility of the jaws in order to permit entrance of the wheel into the wheel-mounting space of the wheel-mounting member during assembly such that the jaws cannot be compressed after assembly, thereby preventing removal of the wheel from the wheel-mounting member.

SUMMARY OF THE INVENTION

The object of this invention is to provide another wheel assembly that is adapted to be mounted on a wheel-bearing tube of an exerciser without the need for a locking bolt.

According to this invention, a wheel assembly is to be mounted on a wheel-bearing tube of an exerciser, and includes a tubular wheel-mounting member of molded plastic, and an annular wheel. The wheel-mounting member includes a peripheral wall which has a left portion that is adapted to be press-fitted into the wheel-bearing tube via an open right end of the latter, and a right portion that is formed with a closed end wall. The peripheral wall further has a first outward flange projecting radially from the closed end wall, and a second outward flange disposed circumferentially on the right portion and inboard to the first outward flange, thereby defining an annular groove between the first and second outward flanges. The second outward flange has an outer diameter greater than an inner diameter of the wheel-bearing tube to abut against the open right end of the wheel-bearing tube to limit axial extension of the peripheral wall into the wheel-bearing tube when the left portion is press-fitted into the wheel-bearing tube. The annular wheel includes a right inner wall section, a left inner wall section which defines an inner diameter greater than an outer diameter of the wheel-bearing tube, and an annular inward protrusion which is formed between the right and left inner wall sections and proximate to the right inner wall section and which has an inner diameter slightly smaller than the outer diameter of the second outward flange so as to permit the second outward flange to slide over the annular inward protrusion when forced in axial direction, thereby retaining rotatably the annular inward protrusion in the annular groove of the wheel-mounting member. The wheel is thus prevented from disengaging the wheel-mounting member, and a tube-accommodating space is defined between an outer circumferential surface of the left portion and the left inner wall section of the wheel-mounting member. After insertion of the wheel-mounting member into the annular wheel, the open right end of the wheel-bearing tube can be inserted into the tube accommodating space, thereby resulting in press-fitting of the left portion of the wheel-mounting member into the wheel-bearing tube to mount the annular wheel rotatably on the wheel-bearing tube.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
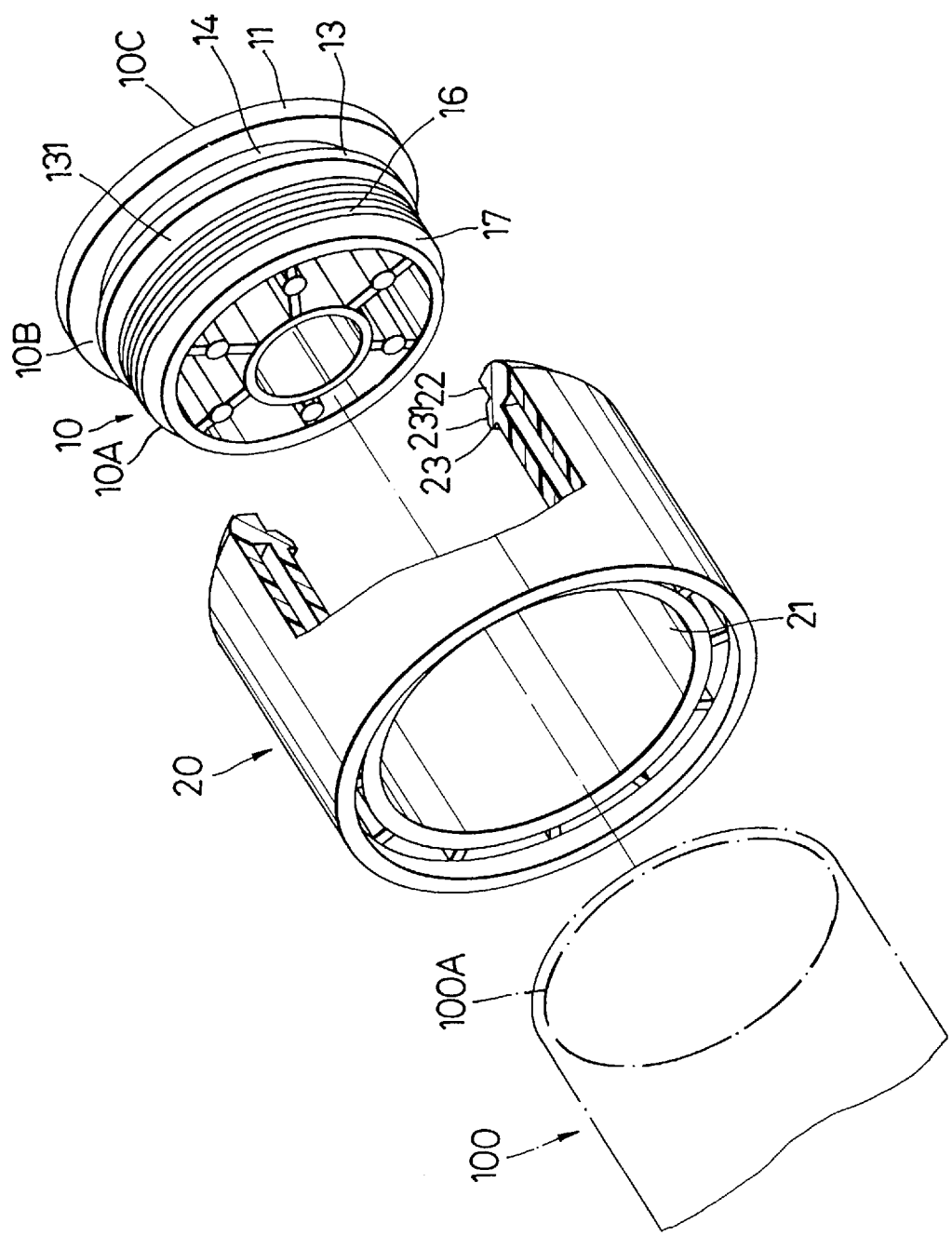
FIG. 1 is an exploded view of a preferred embodiment of a wheel assembly of this invention shown together with a wheel-bearing tube of an exerciser, wherein the wheel is partially cut away to illustrate an interior thereof.
Figure 2:
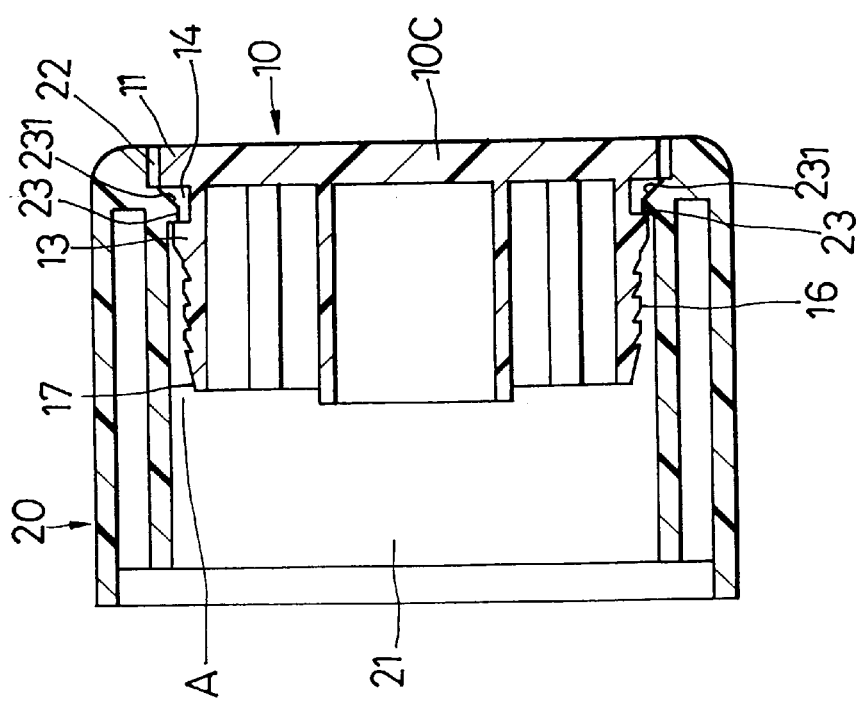
FIG. 2 is a sectional view of the preferred embodiment before mounting on the wheel-bearing tube of the exerciser.

Referring to FIGS. 1 and 2, the preferred embodiment of a wheel assembly of this invention is shown to be mounted on an open right end of a horizontally extending wheel-bearing tube 100 of an exerciser (not shown). The preferred embodiment includes a tubular wheel-mounting member 10 of molded plastic, and an annular wheel 20.

As illustrated, the wheel-mounting member 10 includes a peripheral wall which has a left portion 10A that is adapted to be press-fitted into the wheel-bearing tube 100 via the open right end 100A, and a right portion 10B that is formed with a closed end wall 10C. The peripheral wall further has a first outward flange 11 which projects radially from the closed end wall 10C, and a second outward flange 13 which is disposed circumferentially on the left portion 10A and inboard to the first outward flange 11, thereby defining an annular groove 14 between the first and second outward flanges 11, 13. The second outward flange 13 has an outer diameter greater than an inner diameter of the wheel-bearing tube 100 to abut against the open right end 100A and limit axial extension of the peripheral wall into the wheel-bearing tube 100 when the left portion 10A is press-fitted into the tube 100.

The annular wheel 20 includes a right inner wall section 22, a left inner wall section 21 which defines an inner diameter greater than an outer diameter of the wheel-bearing tube 100, and an annular inward protrusion 23 which is formed between the right and left inner wall sections 22, 21 and proximate to the right inner wall section 22, and which has an inner diameter slightly smaller than the outer diameter of the second outward flange 13 so as to permit the second outward flange 13 to slide over the annular inward protrusion 23 when forced in axial direction, thereby retaining rotatably the annular inward protrusion 23 in the annular groove 14 and correspondingly preventing disengagement of the annular wheel 20 from the wheel-mounting member 10. A tube-accommodating space (A) is defined between an outer circumferential surface of the left portion 10A and the left inner wall section 21 of the wheel-mounting member 10.

Figure 3:
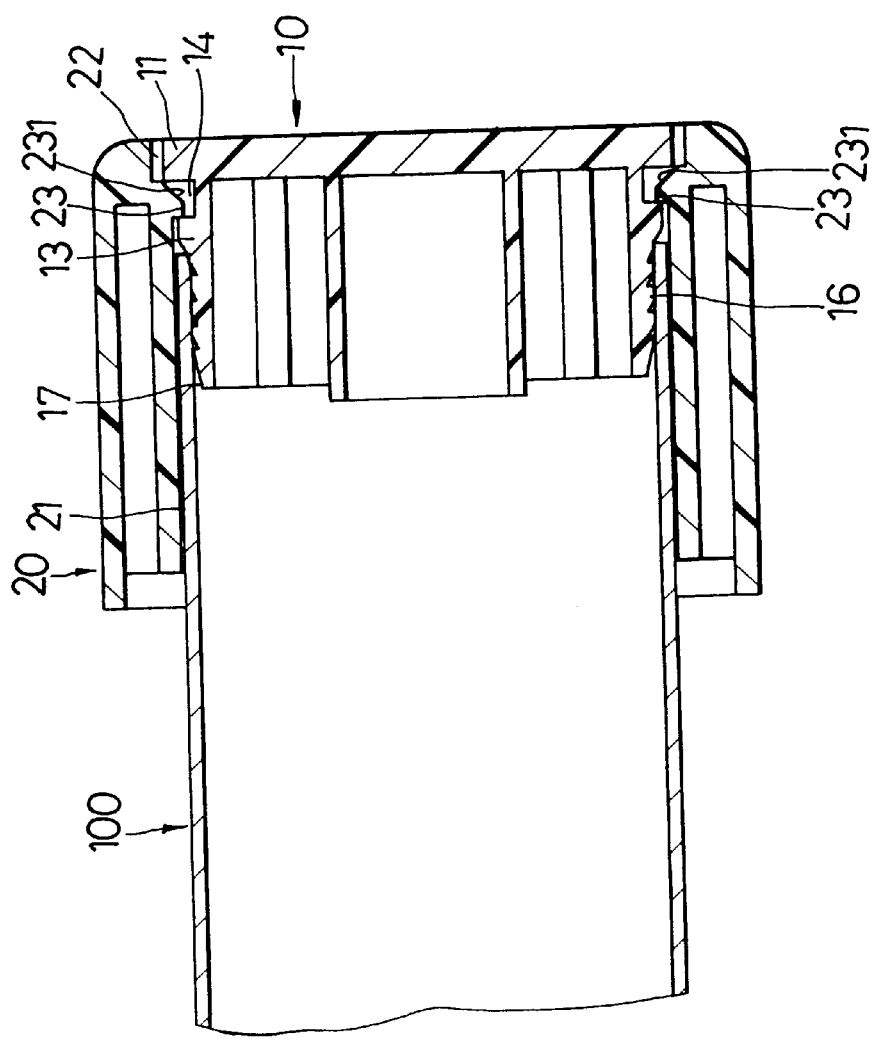
FIG. 3 is a sectional view of the preferred embodiment after mounting on the wheel-bearing tube of the exerciser.

Referring to FIG. 3, after insertion of the wheel mounting-member 10 into the annular wheel 20, the open right end 100A (see FIG. 1) of the wheel-bearing tube 100 can be inserted into the tube accommodating space (A) (see FIG. 2), thereby resulting in press-fitting of the left portion 10A of the wheel-mounting member 10 into the wheel-bearing tube 100 to mount the annular wheel 20 rotatably on the wheel-bearing tube 100.

Referring again to FIG. 1, in the preferred embodiment, the annular inward protrusion 23 is formed with an inclined inner wall section 231 which diverges toward the right inner wall section 22 to facilitate sliding of the second outward flange 13 over the annular inward protrusion 23 during insertion of the wheel-mounting member 10 into the annular wheel 20. The left portion 10A of the wheel-mounting member 10 further has a tapering end 17 distal relative to the second outward flange 13 to facilitate insertion of the wheel-bearing tube 100 into the tube accommodating space (A). The left portion 10A of the wheel-mounting member 10 further has a plurality of resilient engaging ribs 16 circumferentially formed on an outer surface thereof between the tapering end 17 and the second outward flange 13 to provide firm engagement between the wheel-bearing tube 100 and the wheel-mounting member 10.

With this invention thus explained, it is apparent that numerous modifications and variations can be made without departing from the scope and spirit of this invention. It is therefore intended that this invention be limited only as indicated in the appended claims.

I claim:

1. A wheel assembly for an exerciser which includes a horizontally extending wheel-bearing tube with an open right end, said wheel assembly comprising:

a tubular wheel-mounting member of molded plastic, and including a peripheral wall which has a left portion that is adapted to be press-fitted into the wheel-bearing tube via the open right end, and a right portion that is formed with a closed end wall, said peripheral wall further having a first outward flange projecting radially from said closed end wall, and a second outward flange disposed circumferentially on said right portion and inboard to said first outward flange, thereby defining an annular groove between said first and second outward flanges, said second outward flange having an outer diameter greater than an inner diameter of the wheel-bearing tube to abut against the open right end to limit axial extension of said peripheral wall into the wheel-bearing tube when said left portion is press-fitted into the wheel-bearing tube; and an annular wheel including a right inner wall section, a left inner wall section that defines an inner diameter greater than an outer diameter of the wheel-bearing tube, and an annular inward protrusion that is formed between said right and left inner wall sections and proximate to said right inner wall section and that has an inner diameter slightly smaller than said outer diameter of said second outward flange so as to permit said second outward flange to slide over said annular inward protrusion when forced in an axial direction, thereby retaining rotatably said annular inward protrusion in said annular groove and correspondingly preventing disengagement of said annular wheel from said wheel-mounting member, a tube-accommodating space being defined between an outer circumferential surface of said left portion and said left inner wall section of said wheel-mounting member;

whereby, after insertion of said wheel-mounting member into said annular wheel, the open right end of the wheel-bearing tube can be inserted into said tube accommodating space, thereby resulting in press-fitting of said left portion of said wheel-mounting member into the wheel-bearing tube to mount said annular wheel rotatably on the wheel-bearing tube.

2. The wheel assembly as defined in claim 1, wherein said annular inward protrusion is formed with an inclined inner wall section which diverges toward said right inner wall section to facilitate sliding of said second outward flange over said annular inward protrusion during insertion of said wheel-mounting member into said annular wheel.

3. The wheel assembly as defined in claim 1, wherein said left portion of said wheel mounting member has a tapering end distal relative to said second outward flange to facilitate insertion of the wheel-bearing tube into said tube accommodating space.

4. The wheel assembly as defined in claim 3, wherein said left portion of said wheel-mounting member further has a plurality of resilient engaging ribs circumferentially formed on an outer surface thereof between said tapering end and said second inward flange for engagement with the wheel-bearing tube to provide firm engagement between the wheel-bearing tube and said wheel-mounting member.

* * * * *